(12) United States Patent
Moon et al.

(10) Patent No.: US 9,237,308 B2
(45) Date of Patent: Jan. 12, 2016

(54) METHOD AND SYSTEM FOR PROVIDING A TRANSITION BETWEEN LINEAR CONTENT AND NON-LINEAR CONTENT

(75) Inventors: Hannah Y Moon, Boston, MA (US); D. Beau Morley, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 459 days.

(21) Appl. No.: 11/694,910

(22) Filed: Mar. 30, 2007

(65) Prior Publication Data

US 2008/0239169 A1 Oct. 2, 2008

(51) Int. Cl.
*H04N 21/61* (2011.01)
*H04N 21/234* (2011.01)
*H04N 21/2387* (2011.01)
*H04N 21/6587* (2011.01)
*H04N 21/442* (2011.01)
*H04N 7/16* (2011.01)
*H04N 5/445* (2011.01)
*H04N 5/783* (2006.01)
*H04N 21/2543* (2011.01)
*H04N 21/431* (2011.01)
*H04N 21/432* (2011.01)
*H04N 21/433* (2011.01)
*H04N 21/478* (2011.01)
*H04N 21/81* (2011.01)
*H04N 9/82* (2006.01)

(52) U.S. Cl.
CPC .......... *H04N 7/163* (2013.01); *H04N 5/44543* (2013.01); *H04N 5/783* (2013.01); *H04N 21/2543* (2013.01); *H04N 21/4312* (2013.01); *H04N 21/4314* (2013.01); *H04N 21/4325* (2013.01); *H04N 21/4333* (2013.01); *H04N 21/478* (2013.01); *H04N 21/812* (2013.01); *H04N 9/8205* (2013.01)

(58) Field of Classification Search
CPC ............ H04N 21/812; H04N 21/6125; H04N 21/23424; H04N 21/2387; H04N 21/6587; H04N 21/44222
USPC .................................. 725/32–36, 134, 142, 8
See application file for complete search history.

(56) References Cited

U.S. PATENT DOCUMENTS

| | | | |
|---|---|---|---|
| 7,150,031 B1* | 12/2006 | Rodriguez et al. | 725/58 |
| 2001/0032333 A1* | 10/2001 | Flickinger | 725/39 |
| 2002/0016965 A1* | 2/2002 | Tomsen | 725/42 |
| 2002/0042914 A1* | 4/2002 | Walker et al. | 725/36 |
| 2002/0087980 A1* | 7/2002 | Eldering et al. | 725/35 |
| 2002/0124255 A1* | 9/2002 | Reichardt et al. | 725/42 |
| 2003/0110511 A1* | 6/2003 | Schutte et al. | 725/131 |
| 2005/0251835 A1* | 11/2005 | Scott et al. | 725/88 |
| 2006/0075452 A1* | 4/2006 | Koch | 725/135 |
| 2006/0294538 A1* | 12/2006 | Li et al. | 725/24 |
| 2008/0168497 A1* | 7/2008 | Mitchem | 725/42 |

\* cited by examiner

*Primary Examiner* — Benjamin R Bruckart
*Assistant Examiner* — Aklil Tesfaye

(57) ABSTRACT

A method and system may include sending a non-linear content signal to cause display of non-linear content at a display device, identifying a termination identifier associated with display of the non-linear content, and sending a graphical user interface signal to cause display of a graphical user interface that includes a current location field and a previous location field. The system and method may further include receiving a selection request selecting one of the current location field and the previous location field.

20 Claims, 10 Drawing Sheets

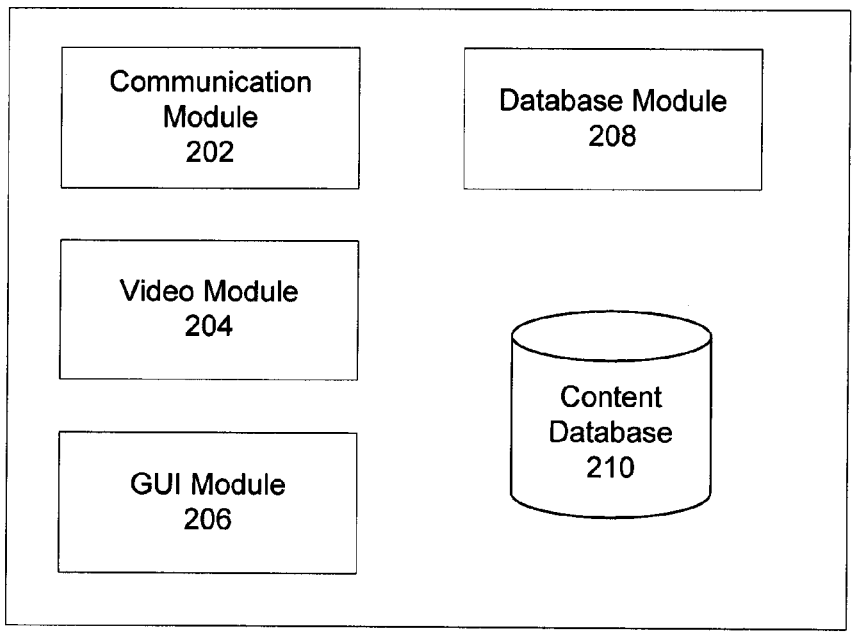

FIG. 2

| Content Table 300 | | | |
|---|---|---|---|
| Linear Content Identifier Column 302 | Time Stamp column 304 | Non-Linear Content Identifier column 306 | Non-Linear Content Description column 308 |
| TV Show - Cooking with Bob | 1:43 PM, Monday, February 12, 2007 | Bob's Recipes | Lasagna |
| TV Show – Working out with Alice | 7:32 PM, Tuesday, February 12, 2007 | Alice's Ab exercising system | Advertisement video for ab exercise belt |
| TV Show - Fishing Live | 3:47 PM, Friday, February 15, 2007 | None | None |

FIG. 3

METHOD AND SYSTEM FOR PROVIDING A TRANSITION BETWEEN LINEAR CONTENT AND NON-LINEAR CONTENT

BACKGROUND INFORMATION

Television and television advertising have existed for many years. Traditionally, television advertisements have been linearly inserted within a program through ten, fifteen, or thirty second segments or spots. Advertisers can purchase advertising spots based on the television programs the advertisers believe their customers may be watching. These spots are interspersed in the broadcast and typically do not involve interactivity with the viewer.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 2 illustrates various modules of a client device in accordance with exemplary embodiments of the present disclosure;

FIG. 3 illustrates a content table stored in a content database in accordance with exemplary embodiments of the present disclosure;

Figure 1:
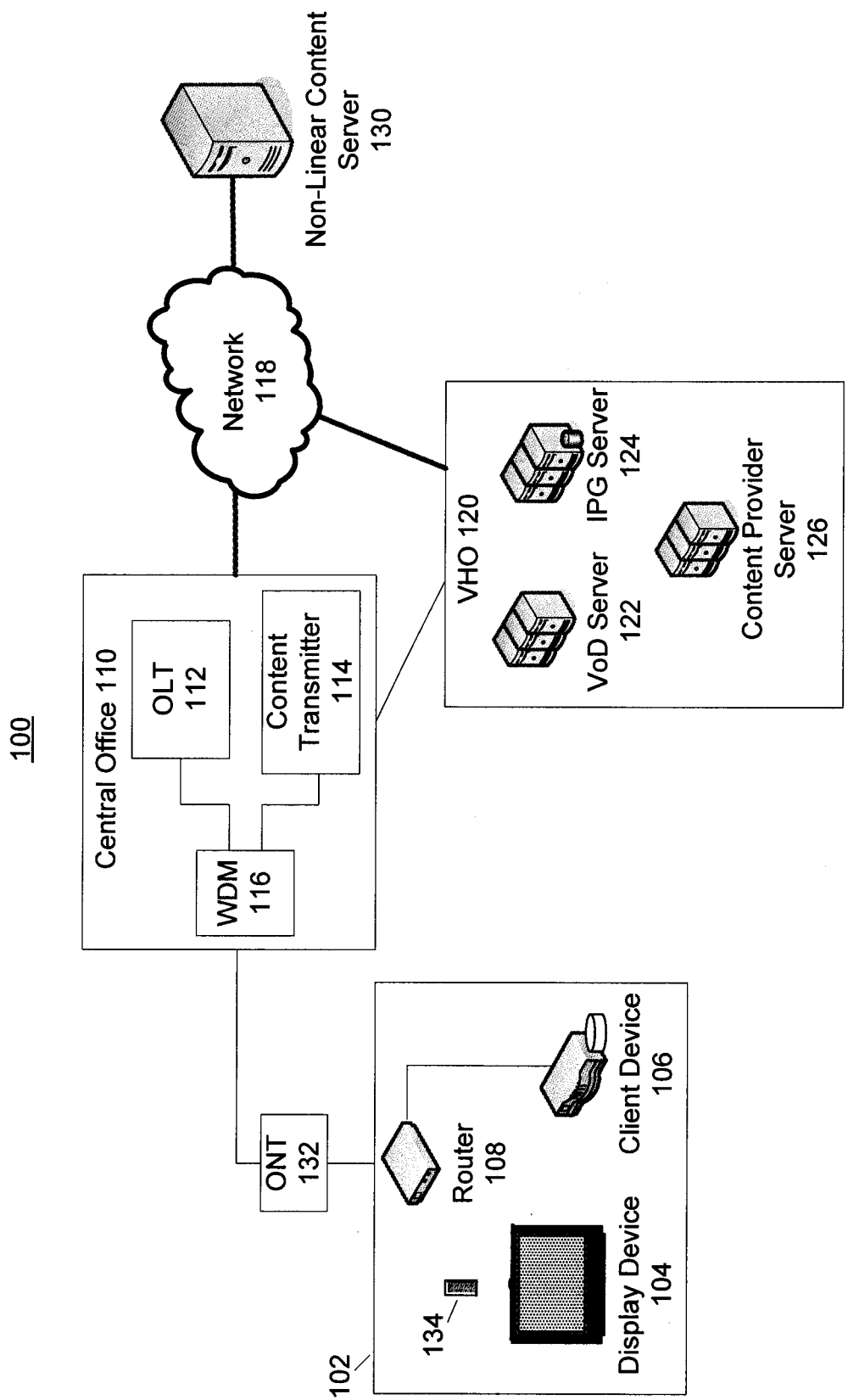
FIG. 1 depicts a system that may provide linear content and non-linear content in accordance with exemplary embodiments of the present disclosure.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments of the present disclosure may include sending a non-linear content signal to cause display of non-linear content at a display device, and identifying a termination identifier associated with display of the non-linear content. The system and method in accordance with exemplary embodiments of the present disclosure may further include sending a graphical user interface signal to cause display of a graphical user interface that includes a current location field and a previous location field, and receiving a selection request selecting one of the current location field and the previous location field.

The description below describes servers, computers, terminals, client devices, and other computing devices that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, terminals, client devices, etc.) separately. The functions described as being performed at various components may be performed at other components, and the various components may be combined and/or separated. Other modifications also may be made.

The conventional linear advertising model does not efficiently use advertising dollars and also does not effectively reach target consumers. Exemplary embodiments of the present disclosure provide a system and method for allowing non-linear and linear content to better coexist by providing a mechanism to seamlessly transition viewers between the two. By having these systems better aligned through a smart user interface (called a Content Transition Interface), one will not cannibalize the other.

Content as used herein may refer to multimedia that uses, for example, one or more of text, audio, graphics, video, and/or combinations thereof. Generally, content may be divided into two categories: linear content and non-linear content. Linear Content may refer to content that is displayable in a predefined sequence, which is determined before a broadcast time of the content. An example of linear content is a television program having commercial advertisements inserted therein in a defined sequence before the program is broadcast. In another example, a television program may include multiple ten, fifteen, or thirty second commercial segments that sequentially follow one another. Non-linear content may refer to content, which is associated with linear content, that involves viewer interaction to access during or after a display of the linear content. The non-linear content may include, for example, audio, video, music, interactive content, time-shifted content, photos, websites, banners, a webpage, recipes, instructions, advertisements, long advertisements (e.g., longer than the traditional thirty second spots used in television programs), text, interactive advertisements, Video on Demand (VoD) content, Video on Demand (VoD) advertising, user generated content, broadband content, additional content that the viewer selects to view, and/or combinations thereof. The non-linear content may include, for example, multimedia for advertising a product and/or service or may include multimedia for describing a topic.

A system in accordance with exemplary embodiments of the present disclosure may present a content transition interface to transition between linear content and non-linear content. The system may allow a viewer to retrieve non-linear content associated with the linear content being broadcast by a content provider. The system according to various exemplary embodiments may permit a viewer to transition from linear content they are watching to view associated non-linear content, and then to return to the linear content at the point where they left, at some later point in the linear content, or to view a live linear content broadcast and have a reminder appear at the end of the linear content broadcast to remind the viewer about the non-linear content.

Allowing the viewer to opt-in and/or out of viewing non-linear content permits the viewer to navigate to non-linear content (e.g., advertisements, etc.) of their choice, which increases the effectiveness of the non-linear content and increases the possibility that the viewer may purchase a product and/or service associated with the non-linear content. Once the viewer has completed reviewing the non-linear content, the content transition interface may return the viewer back to the linear content the viewer was previously watching.

FIG. 1 depicts a system that may provide linear content and non-linear content in accordance with exemplary embodiments of the present disclosure. It is noted that system 100 depicted in FIG. 1 is exemplary. Generally any system where a client device 106 may receive broadcast linear content from a content provider over a communication network and may exchange digital data to request and receive non-linear content may be used. The system 100 also may be implemented by a cable provider, a satellite provider, an Internet provider, a radio provider, a telecommunications provider, or other providers that distribute content (e.g., linear and/or non-linear) to client devices 106.

As depicted, the system 100 may include a subscriber location 102, an optical network termination (ONT) 132, a central office 110, a network 118, a video head office (VHO) 120, and a non-linear content server 130. It is noted that the system 100 is a simplified depiction of a system. Multiple instances of some or all of the components in the system 100 may be used, but have been omitted to prevent obscuring the present disclosure.

The video head office (VHO) 120 may communicate linear content signals to the subscriber location 102 via the central office 110. A client device 106 at the subscriber location 102 may cause a display device 104 to display the received linear content signals representing linear content. The client device 106 may be a digital video recorder, a set top box, a converter, or other device capable of receiving and providing a content signal (e.g., linear content signal, non-linear content signal) to cause display of linear content and/or non-linear content at a display device 104. The client device 106 also may provide a graphical user interface signal to cause display of a graphical user interface at the client device 104. The display device 104 may be a television set, for example. The display device 104 also may be other types of device capable for displaying multimedia, such as, but not limited to, a computer monitor. The client device 106 and the display device 104 also may be a single device, instead of two separate devices, as shown. The linear content signals received from the videohead office (VHO) 120 may be cable television signals and the viewer may select a channel for viewing a particular television program, for example.

The video head office (VHO) 120 may include a Video on Demand (VoD) Server 122, an Interactive Program Guide (IPG) server 124, and a content provider server 126. The Video on Demand (VoD) Server 122 may permit a viewer to select non-linear content for viewing at a time of the viewer's choosing. The Interactive Program Guide (IPG) server 124 may provide guide data useable in a content guide for displaying what linear content is available during a particular time slot. Some or all of the data stored at and/or some or all of the functions performed by the Interactive Program Guide (IPG) server 124, as described herein, also may occur at other devices (not shown) coupled to the network 118 instead of or in addition to the Interactive Program Guide (IPG) server 124. The content provider server 126 may generate the linear content signals useable to display the linear content at the display device 104.

The non-linear content server 130, the Interactive Program Guide (IPG) server 124, and the central office 110 may communicate with one another via the network 118. The network 118 may be a wired network and/or a wireless network, and may communicate using known protocols, such as, but not limited to, circuit-switched protocols (e.g. asynchronous transfer mode (ATM), etc.) and/or packet switched protocols (e.g., Internet Protocol (IP), etc.). Other protocols also may be used and conversions between one or more protocols may occur, both of which are well known.

The non-linear content server 130 may provide an interface for content providers to accept bids and non-linear content from one or more advertisers. The non-linear content server 130 may be, for example, an Intranet Web Server having an Advertisement Server Interface. Advertisers may advertise in linear content and/or in non-linear content. The non-linear content server 130 may store non-linear content that may be displayed at the display device 104. The non-linear content server 130 may communicate the non-linear content to the client device 106 to cause display at the display device 104, as described in further detail below. The non-linear content server 130 may store non-linear content, non-linear content identifiers associated with the non-linear content, linear content, linear content identifiers associated with the linear content. Each content identifier (non-linear and linear) may be, for example, a letter sequence, a number sequence, a symbol sequence, other information useable to uniquely identify content, and/or combinations thereof. The linear content identifier may be assigned by a broadcaster to distinguish linear content from other linear content. For example, the linear content identifier may be a number and letter sequence "XR234CWB—Episode 27" unique to this television program. The non-linear content server 130 may assign non-linear content identifiers to the uploaded non-linear content. For example, the non-linear content identifier may be a number and letter sequence "MRXE93—advertisement 77" unique to this television program.

The non-linear content server 130 may map and/or associate the non-linear content identifier to the linear content identifiers. This association may permit the non-linear content server 130 to inform the Interactive Program Guide (IPG) server 124 what non-linear content is associated with the linear content. The linear content identifiers may be associated with linear content previously broadcast, linear content currently being broadcast, or linear content that may be broadcast at some future time. The non-linear content identifiers also may be associated with non-linear content. Each non-linear content identifier may be unique to distinguish non-linear content from other non-linear content.

The non-linear content server 130 may implement a Pay Per Click (PPC) Advertising model where advertisers may be charged when a viewer selects to access the non-linear content. In an exemplary embodiment, the non-linear content server 130 may permit advertisers to place bids to have non-linear content associated with linear content being broadcast by the content provider server 126. For example, the advertiser may bid to have their non-linear content, which may be a video advertisement, associated with a particular television program.

The one or more advertisers with the highest bid or bids may have a non-linear content identifier field appear in an updateable non-linear content lineup display presented to the viewer via the client device 106, as discussed in further detail below. The non-linear content server 130 may specify a minimum bid amount for display in a non-linear content identifier field of the updateable non-linear content lineup display, or may display non-linear content identifier fields for all bids received from the advertiser.

It is noted that other revenue models may be used other than a pay per click model based on receiving bids. The revenue model may be similar to conventional television advertising models with rates for presenting non-linear content of advertisers being set based on a time of day, ratings of a linear content (e.g., television ratings), availability of avails, and/or other metrics associated with television advertising. An avail may refer to advertising spots available to a linear content provider to insert local advertising. Also, advertisers may be charged according to a pricing formula based on a percentage used of a screen of the display device 104.

To provide the non-linear content identifier field in a graphical user interface display to the viewer at the display device 104, in addition to submitting a bid, the advertiser may upload non-linear content to the non-linear content server 130 for storage and/or may include a link (e.g., Uniform Resource locator) to the non-linear content.

Once the bid is received and the non-linear content is uploaded, the non-linear content server 130 may associate the uploaded non-linear content with a linear content identifier of the linear content the advertiser has bid on. The non-linear content server 130 may periodically communicate an advertisement message to the Interactive Program Guide (IPG) server 124. The advertisement message may include a linear content identifier of the linear content the advertiser has bid on, and a non-linear content identifier to identify the non-linear content uploaded by the advertiser. The non-linear content identifier may uniquely identify the non-linear content associated with the linear content. The non-linear content identifier may be used to retrieve the associated non-linear content from the non-linear content server 130.

The Interactive Program Guide (IPG) server 124 may provide guide data for use in a graphical user interface displayed at the display device 104 to permit the viewer to identify and select desired linear content for viewing. The Interactive Program Guide (IPG) server 124 also may forward non-linear content identifiers for use in notifying the viewer about non-linear content associated with a particular linear content. The Interactive Program Guide (IPG) server 124 may forward the non-linear content identifiers along with the linear content signals. Also, the client device 106, when a viewer selects to view a particular linear content, may forward a non-linear content identifier request that includes a linear content identifier of the selected linear content to request whether any non-linear identifiers are associated with the linear content identifier. The Interactive Program Guide (IPG) server 124 may then return any non-linear content identifiers associated with the linear content identifier.

The Interactive Program Guide (IPG) server 124 may include one or more databases for storing the linear content identifiers, and any non-linear content identifiers associated with the linear content identifiers. The Interactive Program Guide (IPG) server 124 may communicate guide data to the client device 106 via the central office 110. The guide data may include the linear content identifiers and the non-linear content identifiers associated with the linear content identifiers. For example, the guide data may include one or more linear content identifiers of the linear content being broadcast during a time slot, along with any non-linear content identifiers associated with the linear content identifiers. The client device 106 may store the guide data at a content database. The client device 106 may receive various types of information, linear content, and non-linear content from the central office 110.

In various exemplary embodiments, the central office 110 may communicate using a passive optical network. Other networks instead of or in addition to a passive optical network also may be used. The passive optical network may, for example, comply with the International Telecommunication Union Telecommunication Standard (ITU-T) Recommendation G.983.1 titled "Broadband Optical Access Systems based on Passive Optical Networks (PON)," January 2005, the contents of which are incorporated by reference in its entirety.

The central office 110 may communicate the non-linear content identifiers, the linear content identifiers, the linear content signals, and other information to the optical network termination (ONT) 132. The central office 110 may include a wave-division multiplexer to combine signals received from the video head office (VHO) 120 and from the network 118 for transport to the optical network termination (ONT) 132. The optical line terminal (OLT) 112 may communicate digital data to and from the network 118. The content transmitter 114 may receive video content signals from the video head office (VHO) 120. The wavelength division multiplexer (WDM) 116 may multiplex the downstream digital data optical signals received from the optical line terminal (OLT) 112 with the radio frequency video signal received from the content transmitter 114.

Downstream digital data optical signals transmitted from the wavelength division multiplexer (WDM) 116 to the optical network termination (ONT) 132 may use a 1490 nanometer (nm) wavelength. A radio frequency optical video signal may be transmitted from the wavelength division multiplexer (WDM) 116 to the optical network termination (ONT) 132 may use a 1550 nanometer (nm) wavelength. Upstream digital data optical signals transmitted from the optical network termination (ONT) 132 to the wavelength division multiplexer (WDM) 116 may use a 1310 nanometer (nm) wavelength. The radio frequency optical video signal may comply with the with the American National Standard Society of Cable Telecommunication Engineers standard ANSI/SCTE 07 2006 titled "Digital Transmission Standard for Cable Television," the contents of which are incorporated by reference in its entirety. Other optical and non-optical communication systems and networks conforming to other standards also may be used.

In various exemplary embodiments, the wavelength division multiplexer (WDM) 116 may wavelength division multiplex the 1490 nanometer (nm) wavelength of the downstream digital data optical signals with the 1550 nanometer (nm) wavelength of the radio frequency optical video signal for transmission to the optical network termination (ONT) 132. The wavelength division multiplexer (WDM) 116 also may demultiplex the 1310 nanometer (nm) wavelength upstream digital data signals received from the optical network termination (ONT) 132 and may forward the upstream digital data signals to the video head office (VHO) 120 and/or to the network 118.

The optical network termination (ONT) 132 may convert the radio frequency optical video signal and the downstream digital data optical signals to electrical radio frequency signals for transmission via coaxial wiring of the subscriber location 102. A router 108 at the subscriber location 102 may receive and forward the electrical radio frequency signals to a client device 106. For example, the client device 106 may be coupled to an Ethernet port of the router 108. Optionally, the router 108 may be omitted and the client device 106 may be connected to the optical networking termination (ONT) 132 and a multimedia over coaxial (MOCA) cable technology may be used for data communication. The client device 106 may process and/or convert the electrical radio frequency signals to cause display of linear and/or non-linear content at the display device 104.

The client device 106 may establish a video communication session for receiving content from the video head office (VHO) 120 and may establish a data communication session for communicating with the non-linear content server 130. The video communication session may communicate video signals in analog and/or digital format. For example, the video communication session may transport radio frequency 64 point signal constellation Quadrature Amplitude Modulation (QAM) digital cable signals, or in other analog or digital cable television formats, as are well known. The video communication session also may transport packetized video.

The data communication session may be used to communicate digital data, such as packets, cells, or other well known digital data types. The data communication session may be used to communicate non-linear content requests from the client device 106 to the non-linear content server 130 and/or Video on Demand (VoD) server 122 to retrieve non-linear content. The non-linear content server 130 and/or Video on Demand (VoD) server 122 may respond to the non-linear content requests with the requested non-linear content using the data communication session. Thus, systems in accordance with exemplary embodiments of the present disclosure may retrieve non-linear content during the linear content broadcast, or may retrieve the non-linear content at a later time. For example, the client device 106 may record a linear content broadcast and the viewer may watch the content two weeks later. The client device 106 may retrieve the non-linear content associated with the linear content via the data communication session.

FIG. 2 illustrates various modules of the client device 106 in accordance with exemplary embodiments of the present disclosure. The client device 106 may permit a viewer to navigate back and forth from linear content to non-linear content associated with the linear content. The client device 106 may receive guide data from the Interactive Program Guide (IPG) server 124 that indicates whether any non-linear content is associated with the linear content. When non-linear content is available, the client device 106 may permit the viewer to view the live broadcast linear content and store one or more non-linear content identifiers for viewing the non-linear content at a later time. Also, the client device 106 may buffer the live broadcast linear content and cause display of the non-linear content. After the display, the client device 106 may permit the viewer to return to linear content at the point where the viewer left off or may return the viewer to linear content being broadcast, as discussed in further detail below.

To control what linear content is being displayed at the display device 104, the client device 106 may receive input from the viewer from an input device 134. The input device 134 may be a remote control, a keyboard, or other device that may receive and communicate input from a viewer to the client device 106. The viewer may use the input device 134 to generate various requests instructing the client device 106 to switch between different linear content being broadcast and to access non-linear content.

Figure 13:
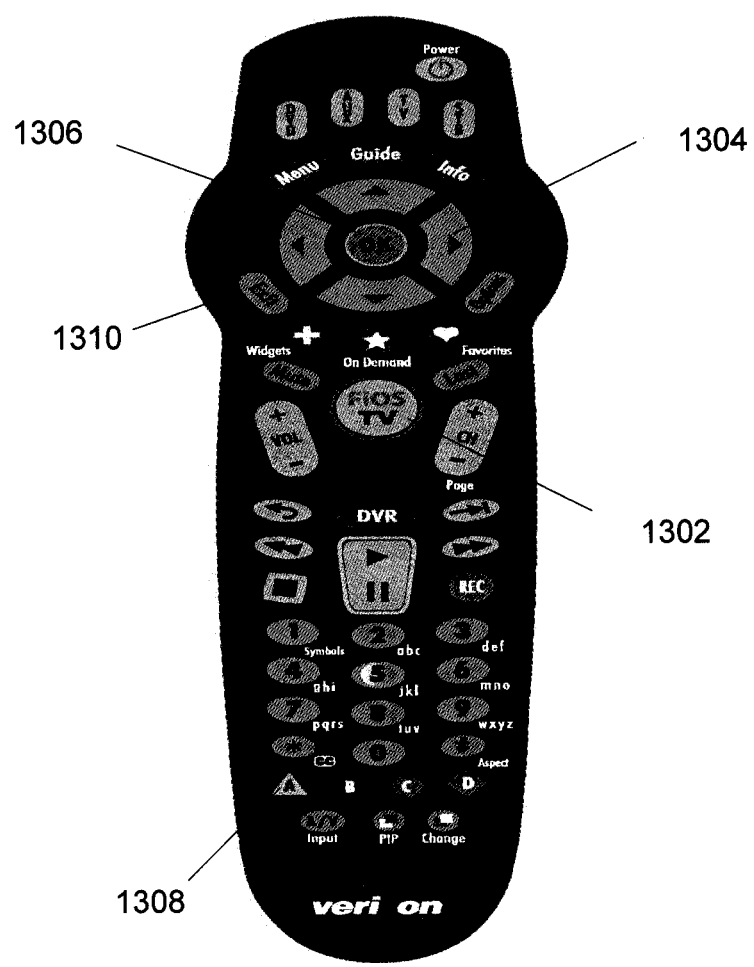
FIG. 13 illustrates an input device in accordance with exemplary embodiments of the present disclosure.

FIG. 13 illustrates an input device in accordance with exemplary embodiments of the present disclosure. The commands may be, for example, a display graphical user interface command 1302, one or more navigation commands 1304, a selection command 1306, and an exit command 1310. The exit command 1310 may communicate a termination identifier to exit out of a display of a graphical user interface, the display graphical user interface command 1302 may instruct the client device 106 to cause the display of a graphical user interface, the one or more navigation commands 1304 may be arrows for scrolling through and highlighting various fields of a graphical user interface, and the selection command 1306 may select a particular field within the graphical user interface. It is noted that the input device 134 is depicted as being a remote control with keys that may be pressed by a user. The input device 134 also may include a touchscreen where the viewer may touch an icon on a display (e.g., on display device 104). Other input devices also may be used, such as, but not limited to, voice activated or gesture activated input devices.

Referring again to FIG. 2, to process the requests from the input device 134 and to cause display of linear and/or non-linear content, the client device 106 may include a communication module 202, a video module 204, a graphical user interface module 206, a database module 208, and a content database 210. The communication module 202 may exchange electrical analog and/or digital radio frequency signals with the optical network termination (ONT) 132 for communication with various devices of the system 100. The communication module 202 may communicate electrical analog and/or digital radio frequency signals received from the optical network termination (ONT) 132 to the video module 204, the graphical user interface module 206, and/or the database module 208.

The video module 204 may receive and process content signals, which may be linear and/or non-linear, to cause display of the linear and/or non-linear content at the display device 104. The linear content signals may be packets (e.g., Internet Protocol packets, etc.), cells (e.g., Asynchronous Transfer Mode (ATM) cells, etc.), or other digitized representations of content. The linear content signals also may be analog signals (e.g., Radio Frequency video signals, 64 point signal constellation Quadrature Amplitude Modulation (QAM) digital cable signal, 256 point signal constellation QAM digital cable signal, etc.). The video module 204 may process and generate an output signal to cause the display device 104 to display the received linear content signals. The video module 204 also may send graphical user interface signals received from the graphical user interface module 206 to cause display of a graphical user interface at the display device 104.

The graphical user interface module 206 may receive and process digital data radio frequency signals for generating a graphical user interface to permit the viewer to select non-linear content, and for generating a content transition interface to transition the viewer from non-linear content to linear content. The content transition interface may be a control panel. The client device 106 may cause display of the graphical user interface and of the content transition interface at the display device 104. For example, the graphical user interface may appear at a television screen as an overlay over a television program to give the viewer options of available non-linear content associated with the television program. The content transition interface may transition the viewer from non-linear content to linear content. The graphical user interface and the content transition interface also may be incorporated into an Interactive Programming Guide (IPG) and/or an Interactive Advertising Application (IAA). The graphical user interface will be discussed in further detail below with references to FIGS. 5-6 and 8. The Content Transition Interface will be discussed in further detail below with reference to FIG. 7.

The database module 208 may process instructions from the other modules and may access the content database 210. The content database 210 may store recorded linear content, non-linear content, descriptions of the linear content and/or non-linear content, identifiers of the linear content and/or non-linear content, guide data, and other information which will be further discussed below. The content database 210 may store a content table (or other data structure) that may identify storage locations of recorded linear content, non-linear content, descriptions of the linear content and/or non-linear content, identifiers of the linear content and/or non-linear content, and other information.

FIG. 3 illustrates a content table stored in a content database in accordance with exemplary embodiments of the present disclosure. The content table 300 may include a linear content identifier column 302, a time stamp column 304, a non-linear content identifier column 306, and a non-linear content description column 308.

The linear content identifier column 302 may store a linear content identifier for some or all of the linear content currently being broadcast, and optionally may store linear content identifiers of linear content previously broadcast or being broadcast at a future time. The linear content identifier column 302 also may include linear content identifiers of the linear content the viewer has selected to record or has selected to store non-linear content associated with the linear content.

The time stamp column 304 may store a time stamp associated with a time and/or a date when the viewer selected to record a particular linear content or a time when the viewer exits viewing linear content to view the available non-linear content associated with the linear content. When a viewer selects to access non-linear content during a broadcast of the linear content, the time stamp may be used to return the viewer to the location in the linear content where the viewer left the linear content to view the associated non-linear content. The non-linear content server 130 may store the time stamps in addition to or instead of storing time stamps at the content database 210.

The non-linear content identifier 306 may store a non-linear content identifier that may unique identify non-linear content selected by the viewer. The client device 106 may use a stored non-linear content identifier to retrieve non-linear content from the non-linear content server 130 at a time of the viewer's choosing. The viewer also may store non-linear content identifiers in a favorites' list, for example. The favorites list may be a list of non-linear content identifiers to which the viewer wants to have available to quickly retrieve their favorite non-linear content.

The non-linear content description column 308 may store a non-linear content description of the stored non-linear content identifier. The non-linear content description may be a short description of the non-linear content that the viewer may retrieve. For example, for non-linear content that is a fishing video on bass fishing, the non-linear content description may include a description of the host, the location, and a synopsis of what occurs in the fishing video (e.g., guide information, etc.). The content table 300 may be used to populate various fields in the graphical user interface and/or in the content transition interface.

Figure 4:
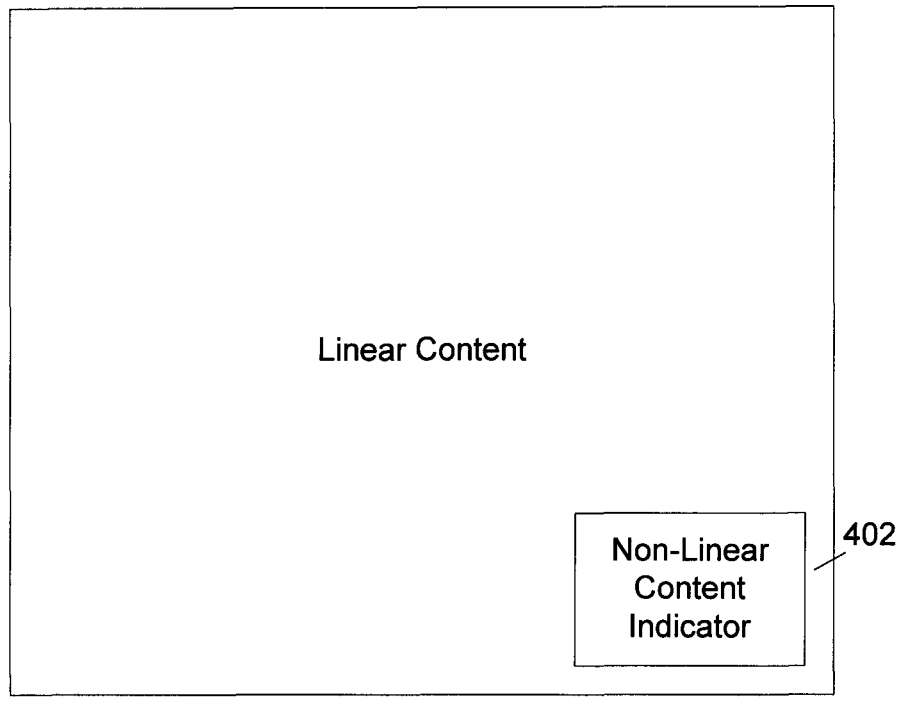
FIG. 4 illustrates linear content being displayed to a viewer at a display device in accordance with exemplary embodiments of the present disclosure.

FIG. 4 illustrates linear content being displayed to a viewer at the display device 104 in accordance with exemplary embodiments of the present disclosure. The display device 104 may display linear content, which may be, for example, a television program. When a viewer selects to view a particular linear content, the client device 106 may determine whether the recording capabilities are available. If available, the client device 106 may begin recording the broadcast linear content and may store the recorded linear content in the content database 210. For example, the client device 106 may begin recording a broadcast television program each time the viewer decides to change a channel to view a different television program. Otherwise, if recording capabilities are not available, the client device 106 may not record the broadcast linear content.

The client device 106 also may process the guide data stored at the content database 210 to identify any non-linear content associated with the linear content being viewed by the viewer, as discussed above. If non-linear content is available, the client device 106 may cause the display device 104 to display a non-linear content indicator 402 (e.g., overlaying the non-linear content indicator 402 over the linear content). The non-linear content indicator 402 may be a visual indicator indicating to the viewer that non-linear content is available for the linear content being viewed by the viewer. Also, the non-linear content indicator 402 may not be displayed and instead a viewer use the input device 134 to have the client device 106 indicate whether any non-linear content is available for the linear content. The viewer may input a command at the input device 134 to instruct the client device 106 to retrieve the non-linear content. The non-linear content indicator 402 may be associated with a non-linear content identifier, which the client device 106 may include in a non-linear content request forward to the non-linear content server 130. The non-linear content server 130 may retrieve non-linear content associated with the non-linear content identifier, and may forward the non-linear content to the client device 106 in a non-linear content response. The client device 106 may then output a non-linear content signal to cause display of the non-linear content at the display device 104. Also, the non-linear content indicator 402 may be used to inform the viewer that multiple non-linear content is available, as discussed in further detail below.

In another exemplary embodiment, the client device 106 may not overlay the non-linear content indicator 402 over the linear content signal. Instead, the non-linear content indicator 402 may be included in the linear content signal. This also may be referred to as "baking" instructions into the linear content without an overlay. Thus, because the non-linear content indicator 402 is included in the broadcast linear content signal, the client device 106 may not process any guide data to determine whether any non-linear content is available. For example, the non-linear content indicator 402 may be a graphic associated with a car company. The graphic may prompt the viewer to visit the car company's virtual showroom. The graphic also may display the non-linear content identifier that the viewer may use the input device 134 to select to access the non-linear content. For example, the graphic may include a code (e.g., 902), symbol, letter, or other image as the non-linear content identifier. The viewer may input the non-linear content identifier into the input device 134, which may communicate the non-linear content identifier to the client device 106. The client device 106 may use the non-linear content identifier to retrieve the associated non-linear content, as previously discussed.

If non-linear content is not available, the client device 106 may produce an output signal for displaying an icon and/or other audible and/or visual indicator on the display device 104 to indicate that non-linear content is not available. If non-linear content is available, the client device 106 may produce an output signal for displaying an icon and/or other audible and/or visual indicator on the display device 104 to indicate that non-linear content is available. The client device 106 may present a content transition interface to permit the viewer to transition from non-linear content to linear content.

Figure 5:
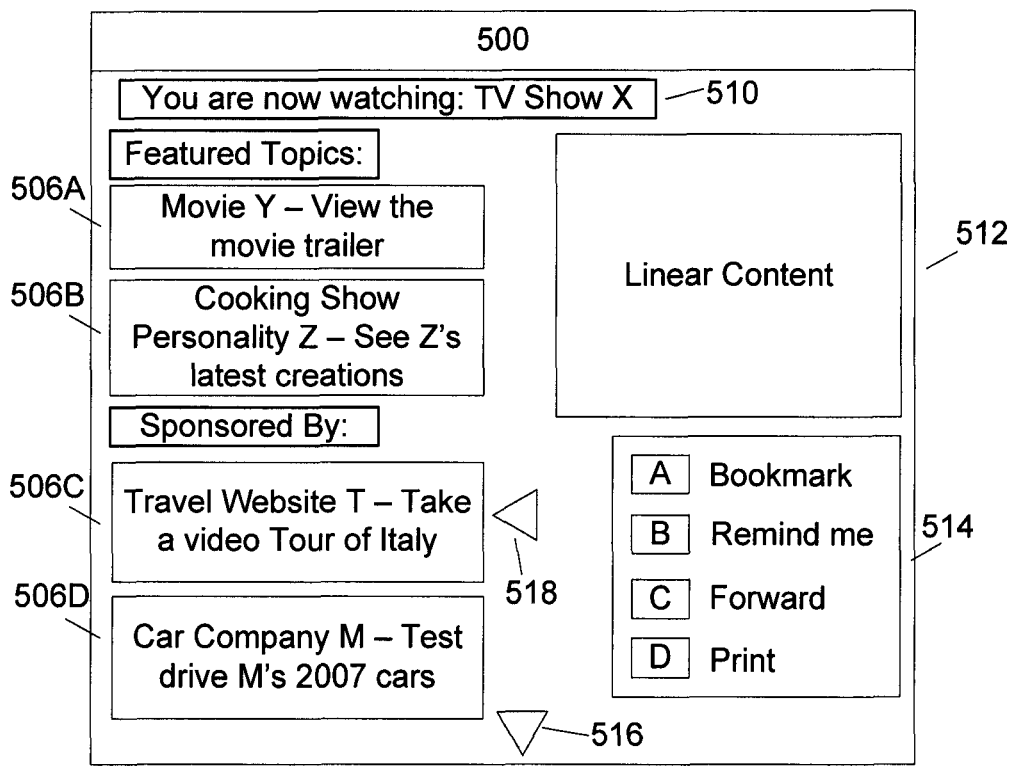
FIG. 5 illustrates a graphical user interface displaying various non-linear content identifier fields associated with available non-linear content in accordance with exemplary embodiments of the present disclosure.

FIGS. 5-8 illustrate various displays presented to the viewer at the display device 104 for identifying and optionally selecting non-linear content in accordance with exemplary embodiments of the present disclosure. FIG. 5 illustrates a graphical user interface displaying various non-linear content identifier fields associated with available non-linear content in accordance with exemplary embodiments of the present disclosure. When the graphical user interface 500 is generated, the video module 204 may resize the linear content that was previously being displayed at the display device 104 in a smaller viewing window 512 so that the viewer may continue to view the linear content within the viewing window 512. The graphical user interface 500 may include a title field 510 for displaying a title of the linear content. For example, the title may be: "You are watching: TV Show X."

The graphical user interface 500 may include one or more non-linear content identifier fields 506 that are viewer selectable to retrieve non-linear content. The non-linear content identifier fields 506 may include text, graphics, audio, video, or other information to inform the viewer about the available non-linear content. For example, a non-linear content identifier field 506 may be a banner advertisement. The non-linear content identifier fields 506 may be associated with non-linear content identifiers, which the client device 106 may use to request the non-linear content associated with the non-linear content identifiers. The viewer may use the input device 134 to navigate through the various non-linear content identifier fields 506. The graphical user interface 500 may include a scroll bar 516 to permit the viewer, using the input device 134, to scroll through the non-linear content identifier fields 506.

The non-linear content identifier fields 506 may correspond to non-linear content uploaded by an advertiser (e.g., an advertisement), and also may correspond to non-linear content uploaded by a content provider (e.g., website associated with the linear content). In an exemplary embodiment, the non-linear content identifier fields 506 may be associated with featured topics of the content provider and/or with non-linear content associated with advertisers of the linear content. The featured topics may include additional information about the linear content being viewed by the viewer. The non-linear content identifier field 506 may be used to retrieve non-linear content associated with the linear content, such as, but not limited to, a recipe that is being used in the linear content, a library of related videos, biographies of actors/actresses, products, services, other information related to the linear content, and/or combinations thereof. For example, a morning television show may have an actor from a movie and a musical artist as guests, and the graphical user interface 500 may include non-linear content that provides additional information about the musical and about the actor's latest movie. The additional information may be, for example, a biography of an actor/actress, a movie trailer, a discount coupon, a downloadable music single, or other information related to the featured topics.

The non-linear content identifier fields 506 associated with advertisers may direct the viewer to non-linear content that may include advertisements. The order in which the non-linear content identifier fields 506 associated with the advertisers are displayed in the graphical user interface 500 may be ranked based on a bid amount submitted by the advertisers. For example, the graphical user interface 500 may include a "Movie Y—View the movie trailer" 506A, a "Cooking Show Personality Z—See Z's latest creations" 506B, "Travel Website T—Take a video tour of Italy" 506C, and "Car Company M—Test drive M's 2007 cars" 506D, which may be displayed in an order based on an amount bid.

Upon selection of a non-linear content identifier field 506 by the viewer using the input device 134, the client device 106 may generate a non-linear content request to retrieve non-linear content from the non-linear content server 130 or from the Video on Demand (VoD) server 122. For example, the non-linear content request may be a hypertext transfer protocol (HTTP) request. The non-linear content request may include a non-linear content identifier associated with the selected non-linear content identifier field 506. The non-linear content server 130 or the Video on Demand (VoD) server 122 may use the non-linear content identifier to identify the non-linear content associated with the non-linear content identifier. The non-linear content may be stored at the non-linear content server 130 or at the Video on Demand (VoD) server 122, or the non-linear content server 130 or the Video on Demand (VoD) server 122 may use the non-linear content identifier to retrieve the non-linear content from another device. The non-linear content server 130 or the Video on Demand (VoD) server 122 may then send a non-linear content response, which includes the requested non-linear content, to the client device 106 via the data communication session. In addition to displaying available non-linear content, the graphical user interface 500 may include a content transition interface command field 514 to instruct the client device 106 to perform functions other than retrieving the non-linear content.

The content transition interface command field 514 may be a control panel displayed in the graphical user interface 500. The viewer may, for example, use an input key 1308 (e.g., A, B, C, D, etc.) on the input device 134 to select the appropriate command from the content transition interface command field 514. Upon navigating to a particular non-linear content identifier field 506, the viewer may depress one of the input keys 1308 on the input device 134 to generate an output signal encoded with a selection request signal including the associated command from the content transition interface command field 514. The content transition interface command field 514 may permit the viewer, using the input device 134, to bookmark non-linear content, to set a reminder to retrieve non-linear content at a later time, to forward non-linear content to another client device, and/or to print non-linear content.

In response to the bookmark command, the client device 106 may store a non-linear content identifier associated with the selected non-linear content identifier field 506 in the content database 210. The client device 106 may use the stored non-linear content identifier to retrieve the non-linear content at a later time or may retrieve the non-linear content for local storage. For example, the client device 106 may store a long advertisement to a favorites list where the viewer can later retrieve and watch the advertisement. The client device 106 may immediately retrieve and store the non-linear content, or instead may store the non-linear content identifier to retrieve the non-linear content at a later time.

In response to the remind command, the client device 106 may store a non-linear content identifier associated with the selected non-linear content identifier field 506. The client device 106 may cause the display device 104 to display a reminder time prompt for the viewer to select a reminder time when to be reminded. The reminder time may instruct the client device 106 when to the display device 104 to display a visual reminder to remind the viewer about the stored non-linear content identifier. The visual reminder also may be appear once an end of a particular linear content is reached. For example, once a television program ends, the client device 106 may cause the display device 104 to display a visual reminder. The viewer may define or set up preferences for when the visual reminders are displayed. The viewer may, for example, select to have the visual reminder displayed the next time they turn on their display device 104 (e.g., next time they turn on their television), once a day, or at other times or time intervals.

In response to the forward command, the client device 106 may forward the non-linear content identifier to another client device local or remote to the subscriber location 102. The client device 106 may send a message (e.g., an email, etc.) containing the non-linear content identifier to the other client device to permit the other client device to retrieve the forwarded non-linear content identifier. For example, a viewer may identify an advertisement of interest to a friend, and may instruct the client device 106 to forward the advertisement to the friend's client device at a different subscriber location. The client device 106 also may forward the non-linear content identifier to other types of devices, such as, but not limited to, a computer, a mobile phone, etc.

In response to the print command, the client device 106 may retrieve the non-linear content and may send a print command to an attached or network printer to print a screen shoot of the non-linear content.

To retrieve non-linear content, the viewer, using the input device 134, may highlight and generate a selection request to select a particular non-linear content identifier field 506. For example, the viewer may select a selection key 1306 of the input device 134 to cause the input device 134 to generate an output signal encoded with a selection request for selecting the highlighted non-linear content identifier field 506.

The graphical user interface 500 may include a visual indicator 518 to indicate which non-linear content identifier field 506 is being highlighted. Other manners of highlighting a non-linear content identifier field 506 also may be used. Upon selection of the non-linear content identifier field 506, the graphical user interface module 206 may determine whether the client device 106 includes recording capabilities (e.g., includes a digital video recorder). If the client device 106 does have recording capabilities, the graphical user interface module 206 may create a time stamp and may instruct the communication module 202 to forward the linear content to the database module 208. The time stamp may store a time and/or date to indicate where in a broadcast of the linear content the viewer decided to access the non-linear content. The database module 208 may store the time stamp and may store the linear content. The stored linear content and the time stamp may permit the content transition interface to give the viewer the option to return to the linear content where the viewer exited the broadcast of the linear content, as discussed in further detail below.

Figure 11:
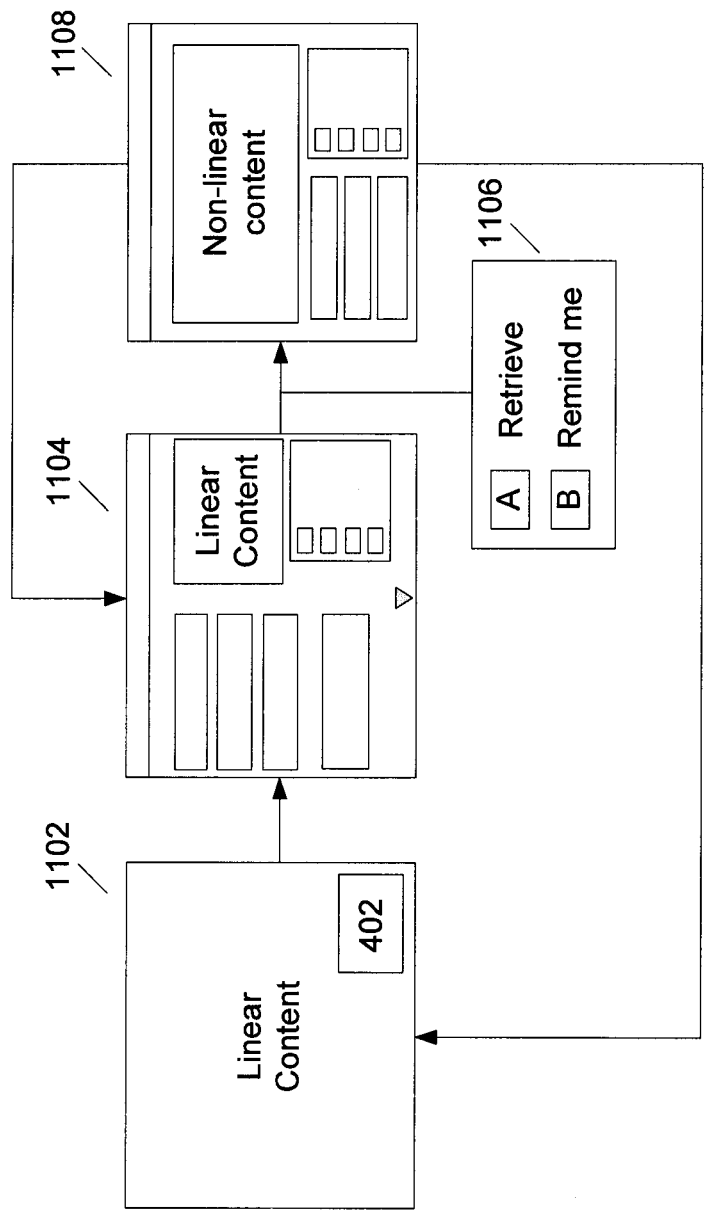
FIG. 11 illustrates various displays presented to a viewer at a display device corresponding to an example in accordance with exemplary embodiments of the present disclosure.

If the client device 106 does not have recording capabilities, the graphical user interface module 206 may update the content transition interface command field 514 to include a retrieve field and a remind field (see FIG. 11, 1106). By selecting the retrieve field, the viewer may instruct the graphical user interface module 206 to retrieve the non-linear content associated with the selected non-linear content identifier field 506. By selecting the remind field, the viewer may instruct the graphical user interface module 206 to create a reminder to remind the user about the stored non-linear content identifier at a later time (e.g., end of the show, different time, different date, next time the display device 104 is turned on, etc.). Also, a selection request received from the input device 134 may indicate whether to immediately retrieve the non-linear content or to store a reminder to retrieve the non-linear content at a later time.

With or without having recording capabilities, if the viewer decides to immediately access the non-linear content, the graphical user interface module 206 may determine whether the non-linear content associated with the selected non-linear content identifier field 506 is stored locally at the client device 106. For example, the graphical user interface module 206 may instruct the database module 208 to query the content database 210 based on the non-linear content identifier associated with the non-linear content identifier field 506. If stored locally, the client device 106 may cause display of the non-linear content at the display device 104.

If the non-linear content is not stored locally, the client device 106 may communicate the non-linear content request via the data communication session to the non-linear content server 130 or to the video on demand (VoD) server 122 depending on where the non-linear content identifier indicates that the non-linear content is stored. For example, the client device 106 may communicate with the non-linear content server 130 or the video on demand (VoD) server 122 via an Internet Protocol channel. The non-linear content server 130 or the video on demand (VoD) server 122 may then send to the client device 106 via the data communication session a non-linear content response that includes the requested non-linear content. When the non-linear content response is received, the client device 106 may process the non-linear content included in the non-linear content response for display at the display device 104.

Figure 6:
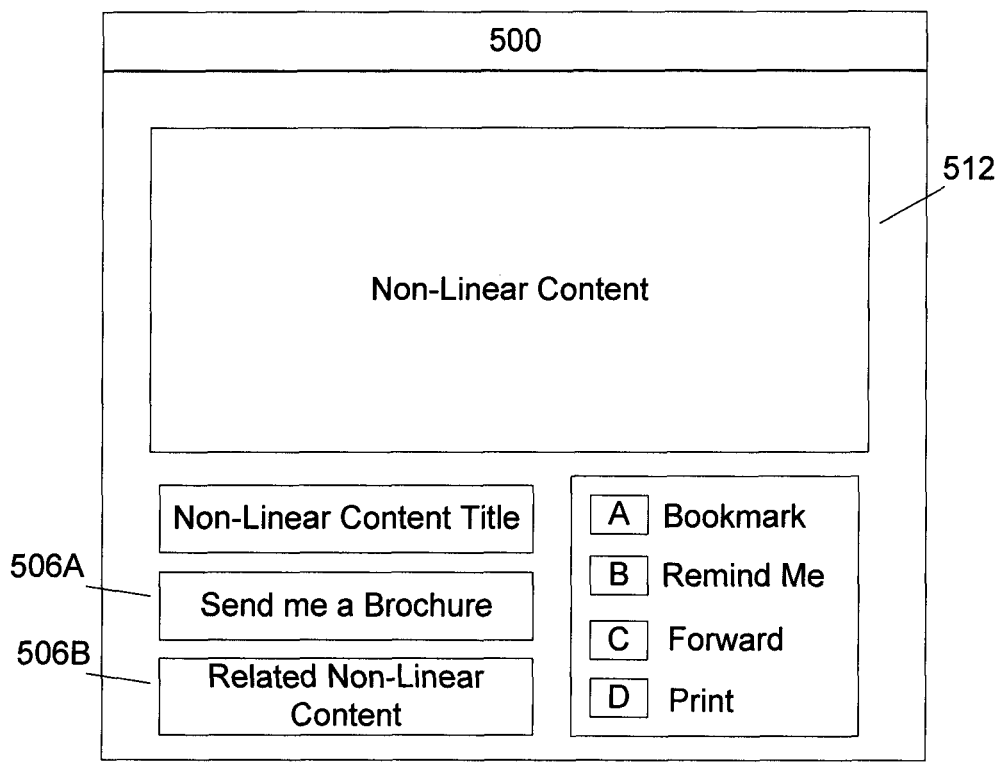
FIG. 6 illustrates a graphical user interface displaying non-linear content in accordance with exemplary embodiments of the present disclosure.

FIG. 6 illustrates a graphical user interface for displaying non-linear content in accordance with exemplary embodiments of the present disclosure. The graphical user interface 500 may provide a shortcut to non-linear content associated with the linear content by informing the viewer about the associated non-linear content, and then presenting the available non-linear content in a non-linear content identifier field (e.g., an icon, button, link, etc.), which may be used to retrieve the associated non-linear content. This advantageously does not involve navigating through multiple interfaces to determine whether any non-linear content is associated with linear content, thus saving time for the viewer and increasing the likelihood that a casual viewer may decide to access the non-linear content.

Once the non-linear content has been received, the client device 106 may cause display of the non-linear content at the display device 104 in the viewing window 512 of the graphical user interface 500. The non-linear content also may be displayed full screen. The viewer additionally may toggle between a full screen view and displaying the non-linear content within the viewing window 512. The non-linear content may be, for example, non-linear video content received from the video on demand (VoD) server 122.

In addition to displaying the non-linear content, the graphical user interface 500 may include one or more non-linear content identifier fields 506 associated with the non-linear content being displayed. The one or more non-linear content identifier fields 506 may permit the viewer to receive additional information related to the non-linear content being displayed in the graphical user interface 500 and/or other advertisers may have submitted bids to have non-linear content identifier fields 506 associated with the non-linear content being displayed. Thus, the viewer may access (e.g., drill down) to locate subtopics of interest or to identify additional non-linear content associated with the non-linear content being displayed. For example, selection of the non-linear content identifier field 506A may instruct the client device 106 to send a message to the non-linear content server 130 to mail the viewer a brochure about the product being advertised. The graphical user interface 500 also may include a related non-linear content identifier field 506B. Selection of the related non-linear content identifier field 506B may retrieve additional information that is related to the non-linear video content. For example, the additional information may be about similar products and/or services from an advertiser. The viewer or the client device 106 may terminate displaying the non-linear content.

To instruct the client device 106 to terminate displaying the non-linear content, the viewer, using the input device 134 may generate an output signal including a termination identifier. For example, the viewer may select an exit key 1310 on the input device 134. The client device 106 also may reach an end of the non-linear content, which may include a termination identifier. Either way, the client device 106 may cause the display device 104 to display a content transition interface to transition from the non-linear content to linear content.

Figure 7:
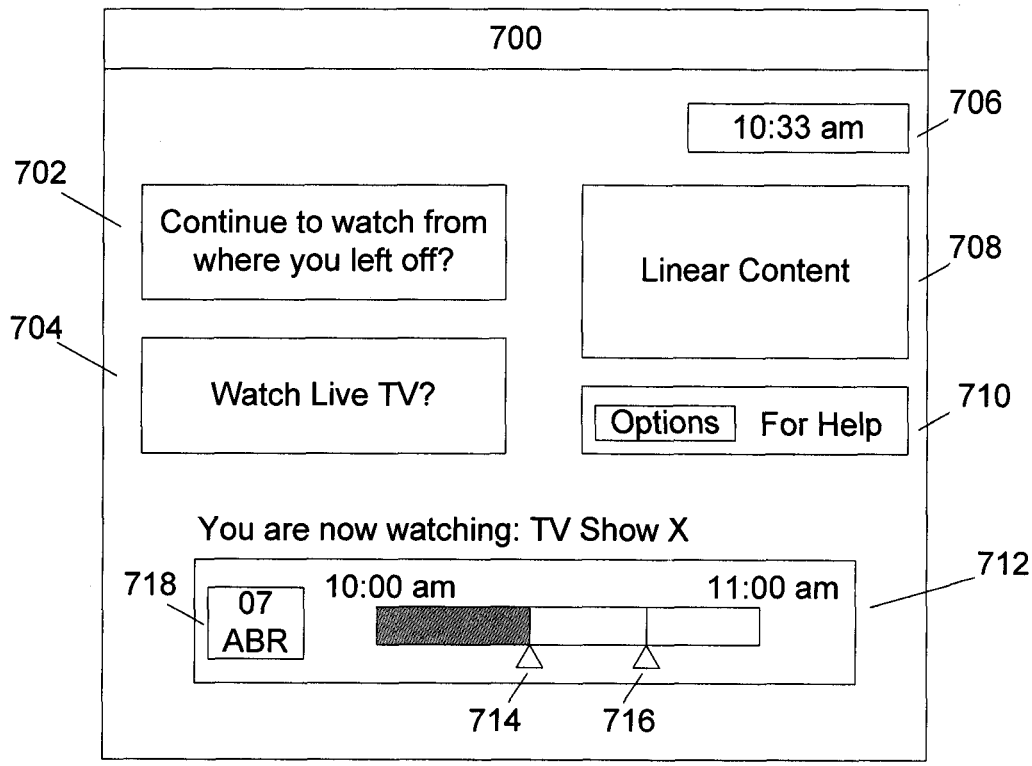
FIG. 7 illustrates a content transition interface in accordance with exemplary embodiments of the present disclosure.

FIG. 7 illustrates a content transition interface in accordance with exemplary embodiments of the present disclosure. The content transition interface 700 may be a graphical user interface presented to the viewer at the display device 104 to transition from non-linear content to linear content. The content transition interface 700 may be presented by client devices 106 having content recording capabilities (e.g., digital video recorder, etc.) to transition the viewer from the selected non-linear content to linear content. If the client device 106 does not have content recording capabilities, upon termination of the non-linear content (i.e., manually or by reaching an end), the client device 106 optionally may skip displaying the content transition interface 700 and may display the live broadcast of linear content received from the video head office (VHO) 120.

The content transition interface 700 may include a time field 706 to display a current time, a viewing window 708 to display live broadcast linear content, and an options field 710 to permit the viewer to select options. The viewing window 708 may display a scaled version of the linear content. The options field 710 may include a variety of options for the viewer. The options field 710 may be associated with a display of the content transition interface 700 for setting viewer preferences. For example, viewers could specify a scaling size of the viewing window 708, a location of the viewing window 708 within the content transition interface 700 (e.g., bottom right corner), or to return to watching live broadcast linear content after non-linear content has ended instead of displaying the content transition interface 700. In addition, options field 710 could lead to a "Help" section that explains the different elements of the content transition interface 700. The content transition interface 700 also may include recommendations for similar shows, show times, and search features in a non-linear content identifier field (not shown).

The content transition interface 700 may transition from displaying non-linear content to return to linear content. The content transition interface 700 may transition the viewer back to displaying the linear content at the point in the linear content where the viewer left off, or may return to causing the display device 104 to display broadcast linear content. The content transition interface 700 may display a live broadcast of linear content in a viewing window 708 and a content status bar 712. The content status bar 712 may indicate how much time has elapsed between when viewer exited the linear content to access the non-linear content. The content status bar 712 may provide the viewer a context for determining whether to return to the linear content where the viewer left off, or to display a live broadcast of linear content.

The content status bar 712 may include an exit location indicator 714 and a current location indicator 716 to indicate to the viewer where the viewer is in the live broadcast of linear content relative to where the viewer left the broadcast of the linear content to view the non-linear content. The exit location indicator 714 may indicate where in the linear content the viewer decided to exit the linear content to view the non-linear content. The graphical user interface module 206 may store a time stamp that may be used to indicate where in the linear content the viewer decided to exit the linear content to view the non-linear content. The exit location indicator 714 may be placed on the content status bar 712 based on the time stamp.

The current location indicator 716 may indicate how much time has elapsed between the time when the viewer exited the linear content and the current time, and optionally how much time remains in the broadcast of the linear content. For example, in a television program that is broadcast between 10:00 am and 11:00 am, the content status bar 712 may include a bar between 10:00 am and 11:00 am. If a viewer selects to view non-linear content beginning at 10:23 am, and ends viewing of the non-linear content ends at 10:41 am, the exit location indicator 714 may be positioned on the content status bar 712 at 10:23 am and the current location indicator 716 may be positioned on the content status bar 712 at 10:41 am.

The content status bar 712 also may include a broadcaster field 718 to identify the call letters of the company broadcasting the content and a channel of the broadcast. For example, the call letters of the company may be "ABR," and the channel broadcasting the content may be "07."

The content transition interface 700 may include a previous location field 702 and a current location field 704. Selecting the previous location field 702 may instruct the client device 106 to return to the location where the viewer exited the linear content to view the non-linear content. Selecting the current location field 704 may instruct the client device 106 to cause display at the display device 104 of live broadcast linear content, which may or may not be the linear content the viewer was watching when the viewer accessed the non-linear content. The content transition interface 700 may display the current location field 704 without the previous location field 702 for client devices 106 that do not include recording capabilities. The input device 134 may communicate a selection request to the graphical user interface module 206 of the client device 106 to select either the previous location field 702 or the current location field 704.

Selection of the previous location field 702 may display the content where the viewer left in the content to begin viewing the non-linear content. The previous location field 702 may include the text, such as, but not limited to, "Continue to watch form where you left off?" Upon selection of the previous location field 702, the graphical user interface module 206 may communicate with the database module 208 to retrieve the stored linear content beginning at the time identified in the time stamp column 304 stored in the content database 210. The content database 210 may then communicate the stored linear content to the video module 204 to display the stored linear content to the viewer at the display device 104 where the viewer exited viewing the linear content. Thus, the viewer may explore the non-linear content without missing any of the linear content.

Selection of the current location field 704 may display live broadcast linear content. Upon selection of the current location field 704, the graphical user interface module 206 may instruct the video module 204 to cause display at the display device 104 of a live broadcast linear content signal to display the linear content as received from the video head office (VHO) 120. The current location field 704 may include, for example, the text "Watch Live TV?" The content transition interface 700 also may display stored non-linear content useable to retrieve non-linear content that the viewer has saved for later viewing.

Figure 8:
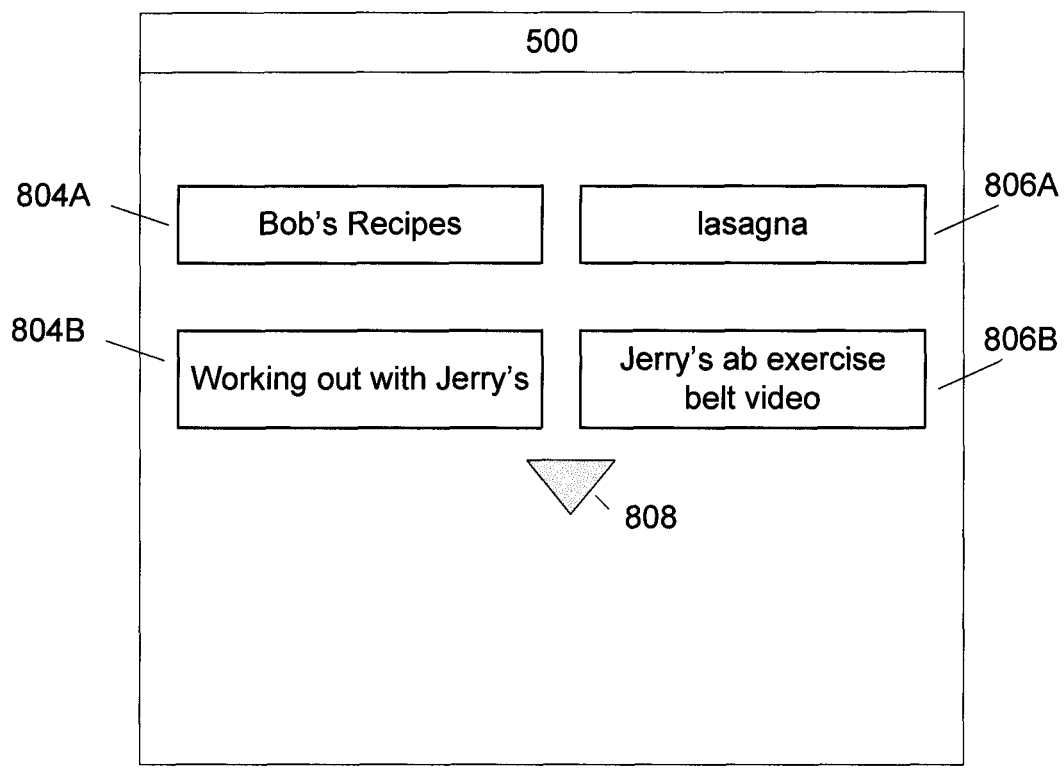
FIG. 8 illustrates a stored non-linear content display of a graphical user interface in accordance with exemplary embodiments of the present disclosure.

FIG. 8 illustrates a stored non-linear content display of the graphical user interface 500 in accordance with exemplary embodiments of the present disclosure. The viewer may, using the input device 134, generate a selection request signal or the graphical user interface 500 may include a bookmark field to request displaying the stored non-linear content display of the graphical user interface 500. The stored non-linear content display of the graphical user interface 500 may include one or more stored non-linear content identifier fields 804 each with an associated non-linear content description field 806. The stored non-linear content identifier field 804 may be associated with a non-linear content identifier useable to retrieve non-linear content locally stored at the content database 210 or from the Video on Demand (VoD) server 122 and/or non-linear content server 130. The non-linear content description field 806 may display the description of the non-linear content stored in the content table 300 (see FIG. 3, column 308). For example, the viewer may have been watching a television program starring Chef Bob. On a particular program, Chef Bob may have been making his mother's famous lasagna. The client device 106 may store a bookmark for Bob's lasagna recipe, which also stores a brief description of the lasagna recipe.

Also, the viewer may have been watching a television program called "Working out with Jerry." On a particular program, Jerry may have been using his new abdomen exercising system. The input device 134 may communicate a selection request signal instructing the client device 106 to store a bookmark for Jerry's abdomen exercising belt and a brief description of the abdomen exercising belt.

The stored non-linear content display of the graphical user interface 500 may display "Bob's recipes" in a stored non-linear content identifier field 804A, and may display the word "lasagna" in the non-linear content description field 806A. The stored non-linear content display of the graphical user interface 500 may display "Working out with Jerry" in a stored non-linear content identifier field 804B, and may display the phrase "Jerry's ab exercising belt video" in the non-linear content description field 806B.

Figure 9:
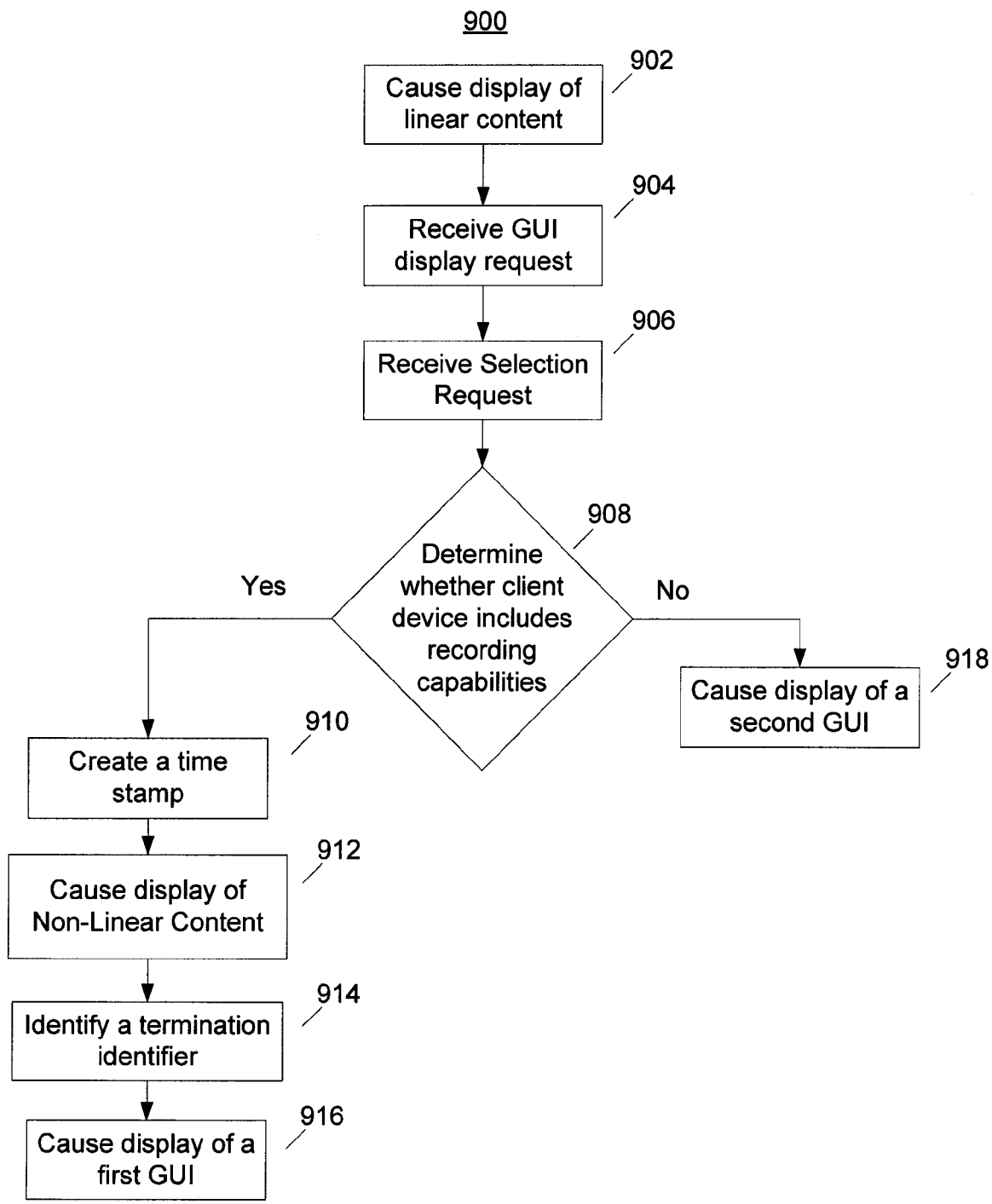
FIG. 9 illustrates a flow diagram of a method in accordance with exemplary embodiments of the present disclosure.

FIG. 9 illustrates a flow diagram of a method in accordance with exemplary embodiments of the present disclosure. This exemplary method is provided by way of example, as there are a variety of ways to carry out methods according to the present disclosure. The method shown in FIG. 9 can be executed or otherwise performed by one or a combination of various systems. The method is described below as carried out by the system 100 shown in FIG. 1 by way of example, and various elements of the system 100 are referenced in explaining the example method of FIG. 9. Each block shown in FIG. 9 represents one or more processes, methods or subroutines carried in the exemplary method. Referring to FIG. 9, the exemplary method 900 may begin at block 902.

In block 902, the method may include sending a linear content signal to cause display of linear content at a display device, the linear content being associated with non-linear content. In an exemplary embodiment, a client device 106 may receive a linear content signal from a video head office (VHO) 120. A video module 204 of the client device 106 may process the linear content signal to cause display device 104 to display linear content based on the linear content signal. The Interactive Program Guide (IPG) server 124 may communicate guide data to the client device 106, and the client device 106 may determine whether the linear content is associated with any non-linear content based on the guide data. The method 900 may continue to block 904.

In block 904, the method may include receiving a graphical user interface display request that requests display of a non-linear content identifier field associated with the non-linear content. In an exemplary embodiment, the client device 106 may receive a graphical user interface display request. In response, the client device 106 may cause display of a graphical user interface that includes a non-linear content identifier field 506 associated with the non-linear content. The method 900 may continue to block 906.

In block 906, the method may include receiving a selection request selecting the non-linear content identifier field. In an exemplary embodiment, the client device 106 may receive a selection request from the input device 134 selecting a non-linear content identifier field 506. The method 900 may continue to block 908.

In block 908, the method may include determining whether a client device includes recording capabilities. In an exemplary embodiment, a graphical user interface module 206 of the client device 106 may determine whether the client device 106 includes recording capabilities. For example, the graphical user interface module 206 may determine whether the client device 106 include a digital video recorder. The method 900 may continue to block 910 in the event that the client device 106 includes recording capabilities, and may continue to block 918 in the event that the client device 106 does not include recording capabilities.

In block 910, the method may include creating a time stamp associated with the selection request. In an exemplary embodiment, a graphical user interface module 206 of the client device 106 may create a time stamp indicating when the selection request is received. The time stamp may indicate a time location in the linear content that the client device 106 may return to when the viewer has terminated viewing the non-linear content. Thus, the viewer may explore non-linear content associated with the linear content without missing any of the linear content. The method 900 may continue to block 912.

In block 912, the method may include sending a non-linear content signal to cause display of the non-linear content associated with the selection request. In an exemplary embodiment, the selection request may be associated with a non-linear content identifier field 506. The non-linear content identifier field 506 may have an associated non-linear content identifier, which the client device 106 may use to retrieve non-linear content from a non-linear content server 130. The client device 106 may cause display of non-linear content at the display device 104. The method 900 may continue to block 914.

In block 914, the method may include identifying a termination identifier associated with display of the non-linear content. In an exemplary embodiment, the client device 106 may identify a termination identifier included in the non-linear content that signals an end of the non-linear content. Also, the viewer may use the input device 134 to communicate a termination request that includes the termination identifier, and the client device 106 may identify the termination identifier in the termination request. The method 900 may continue to block 916.

In block 916, the method may include sending a graphical user interface signal to cause display of a graphical user interface that includes a current location field and a previous location field. In an exemplary embodiment, the graphical user interface module 206 of the client device 106 may generate a content transition interface 500 that includes a current location field 704 and a previous location field 702, as described above. The method 900 may then end for this branch of the method in the event that the client device 106 includes recording capabilities. Returning to block 906, in the event that the client device 106 does not include recording capabilities, the method may continue to block 918.

In block 918, the method may include sending a graphical user interface signal to cause display of a second graphical user interface that includes a retrieve field and a store field. In an exemplary embodiment, the client device 106 may cause display of a graphical user interface 500 that includes a content transition interface command field 514. The content transition interface command field 514 may include a bookmark field that permits a viewer to store a non-linear content identifier for later retrieval of the non-linear content. The graphical user interface 500 may include a retrieve field that permits the user to immediately retrieve the non-linear content. The method 900 may then end.

Figure 10:
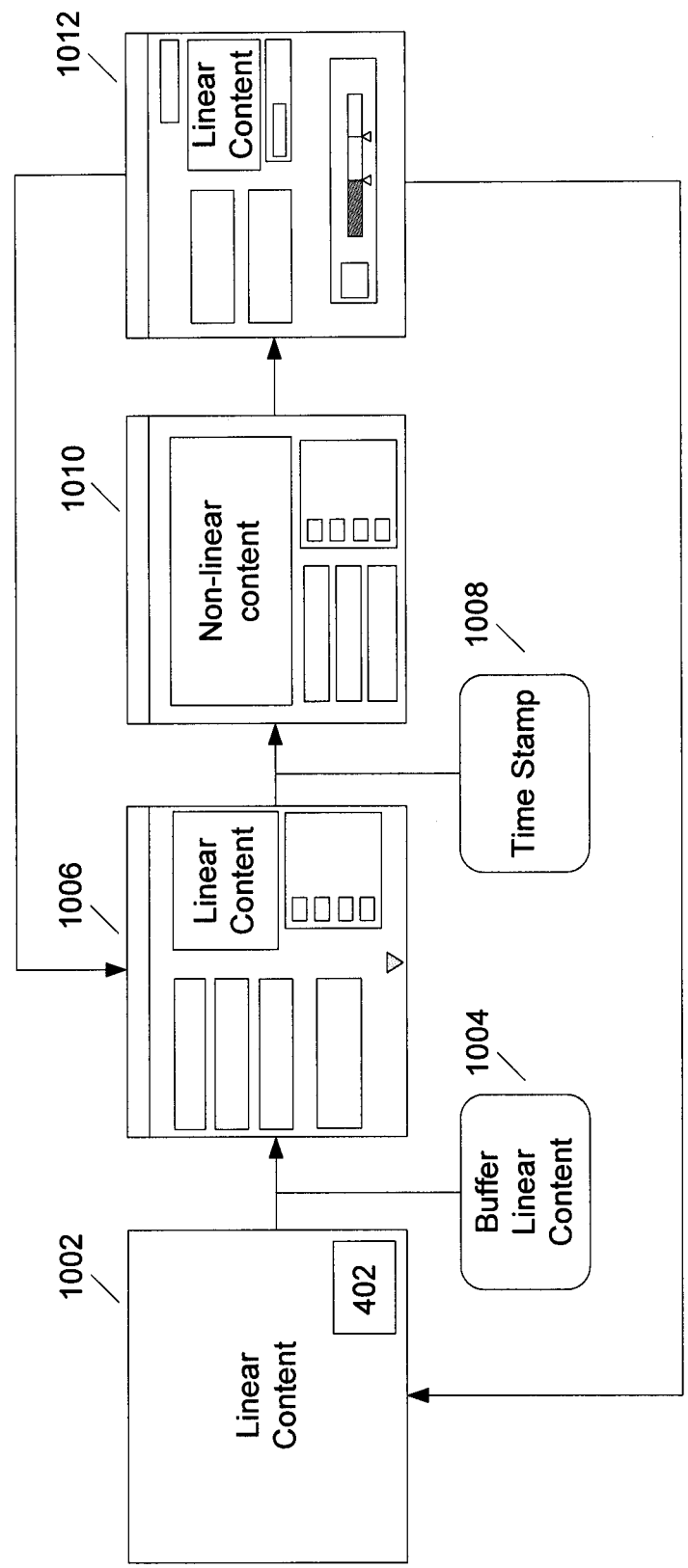
FIG. 10 illustrates various displays presented to a viewer at a display device corresponding to an example in accordance with exemplary embodiments of the present disclosure.

The following describes an example in accordance with exemplary embodiments of the present disclosure. FIG. 10 illustrates various displays presented at the display device 104 to the viewer corresponding to the example in accordance with exemplary embodiments of the present disclosure. In this example, the client device 106 may include linear content recording capabilities. The viewer, using the input device 134, may instruct the client device 106 to display live broadcast linear content at the display device 104 for viewing (see FIG. 10, 1002). A graphical user interface module 206 may determine that the client device 106 has linear content recording capabilities (e.g., a digital video recorder), and may begin recording the linear content (see FIG. 10, 1004). The client device 106 may process guide data received from the Interactive Program Guide (IPG) server 124 to determine whether any non-linear content identifiers are associated with the selected linear content. Also, the client device 106 may query the Interactive Program Guide (IPG) server 124 for the guide data. In this example, the client device 106 may determine that non-linear content is associated with the selected linear content. The client device 106 may then cause the display device 104 to display a non-linear content indicator 402 indicating that non-linear content is available for the selected linear content.

The viewer may see the non-linear content indicator 402 and may cause the input device 134 to send a graphical user interface display request to the client device 106. The client device 106 may then cause the display device 104 to display the graphical user interface 500 (see FIG. 10, 1006). The viewer may use the input device 134 to navigate to a desired non-linear content identifier field 506 and may cause the input device 134 to output a selection request signal to select the desired non-linear content identifier field 506. The client device 106 may receive the selection request signal and may identify a non-linear content identifier associated with the desired non-linear content identifier field 506. At the time the non-linear content identifier field 506 is selected, the graphical user interface module 206 of the client device 106 may create a time stamp and may instruct the database module 208 to store the time stamp (see FIG. 10, 1008). The time stamp may be used to return the viewer to the location in linear content where the viewer exits the linear content and to buffer the broadcast linear content in the content database 210. The client device 106 may determine that the non-linear content is not stored locally, and may generate a non-linear content request including the non-linear content identifier. The client device 106 may send the non-linear content request to the non-linear content server 130.

The non-linear content server 130 may retrieve the non-linear content associated with the non-linear content identifier and may generate a non-linear content response including the retrieved non-linear content. The non-linear content server 130 may then send the non-linear content response to the client device 106. The video module 204 of the client device 106 may generate signals to cause display of the non-linear content at the display device 104 see FIG. 10, 1010).

The graphical user interface module 206 may identify a termination identifier, either associated with a termination request from the viewer or with an end of the non-linear content. The graphical user interface module 206 may instruct then video module 204 to cause display of a previous location field 702 and a current location field 704 in the content transition interface 700 (see FIG. 10, 1012). The content transition interface 700 may prompt the viewer to return to the linear content where they left off and/or may prompt the viewer to watch live broadcast linear content. If the viewer selects the previous location field 702, the graphical user interface module 206 may instruct the database module 208 to retrieve the buffered linear content from the content database 210 based on the time stamp. The video module 204 may cause display of the buffered linear content at the display device 104. If the viewer selects the current location field 704, the graphical user interface module 206 may instruct the video module 204 to display the live broadcast linear content as received from the a video head office (VHO) 120.

The following describes an example in accordance with exemplary embodiments of the present disclosure. FIG. 11 illustrates various displays presented in the display device 104 to a viewer corresponding to the example in accordance with exemplary embodiments of the present disclosure. In this example, the graphical user interface module 206 may determine that the client device 106 does not have linear content recording capabilities. The viewer, using the input device 134, may instruct the client device 106 to display live broadcast linear content to the display device 104 for viewing (See FIG. 11, 1102). The client device 106 may determine whether any nonlinear content is associated with the broadcast linear content based on guide data received from the Interactive Program Guide (IPG) server 124. In this example, non-linear content is available. The client device 106 may then cause the display device 104 to display a non-linear content indicator 402 indicating that non-linear content is available for the selected linear content.

The viewer, using the input device 134, may send a graphical user interface display request signal to the client device 106. The client device 106 may resize the linear content and may include the resized content in a graphical user interface 500. The graphical user interface 500 also may include various non-linear content identifier fields 506 for display to the viewer.

The viewer, using the input device 134, may highlight and generate a selection request to select one of the non-linear content identifier fields 506. In this example, the selected non-linear content identifier field 506 may be non-linear content associated with an advertisement for a car company. The selection request may indicate whether to retrieve the non-linear content for immediate viewing or to store a non-linear content identifier associated with the nonlinear content along with a reminder (see FIG. 11, 1106). Also, the graphical user interface module 206 may receive the selection request and may prompt the viewer whether to retrieve the non-linear content for immediate viewing or to store a non-linear content identifier associated with the nonlinear content along with a reminder. For example, the graphical user interface module 206 may update the content transition interface command field 514 with a retrieve field and a remind field. The client device 106 may display the reminder at the end of the linear content broadcast to remind the viewer about the stored non-linear content identifier. In this example, the selection request selects to store a reminder of the non-linear content for viewing at the end of the live linear content broadcast.

Once the live linear content broadcast ends, the graphical user interface module 206 of the client device 106 may cause the display device 104 to display a reminder for the stored non-linear content identifier. In this example, the viewer, using the input device 134, selects to retrieve the non-linear content. The graphical user interface module 206 may communicate a non-linear content request including the non-linear content identifier to the non-linear content server 130. The non-linear content server 130 may retrieve non-linear content based on the non-linear content identifier and may send a non-linear content response containing the non-linear content to the client device 106. The video module 204 of the client device 106 may generate signals to cause the display device 104 to display the non-linear content (see FIG. 11, 1108).

Upon completion of the non-linear content, the graphical user interface module 206 of the client device 106 may cause display of live broadcast linear content (see FIG. 11, return to 1102) or may cause display of the graphical user interface 500 (see FIG. 11, return to 1104)

Figure 12:
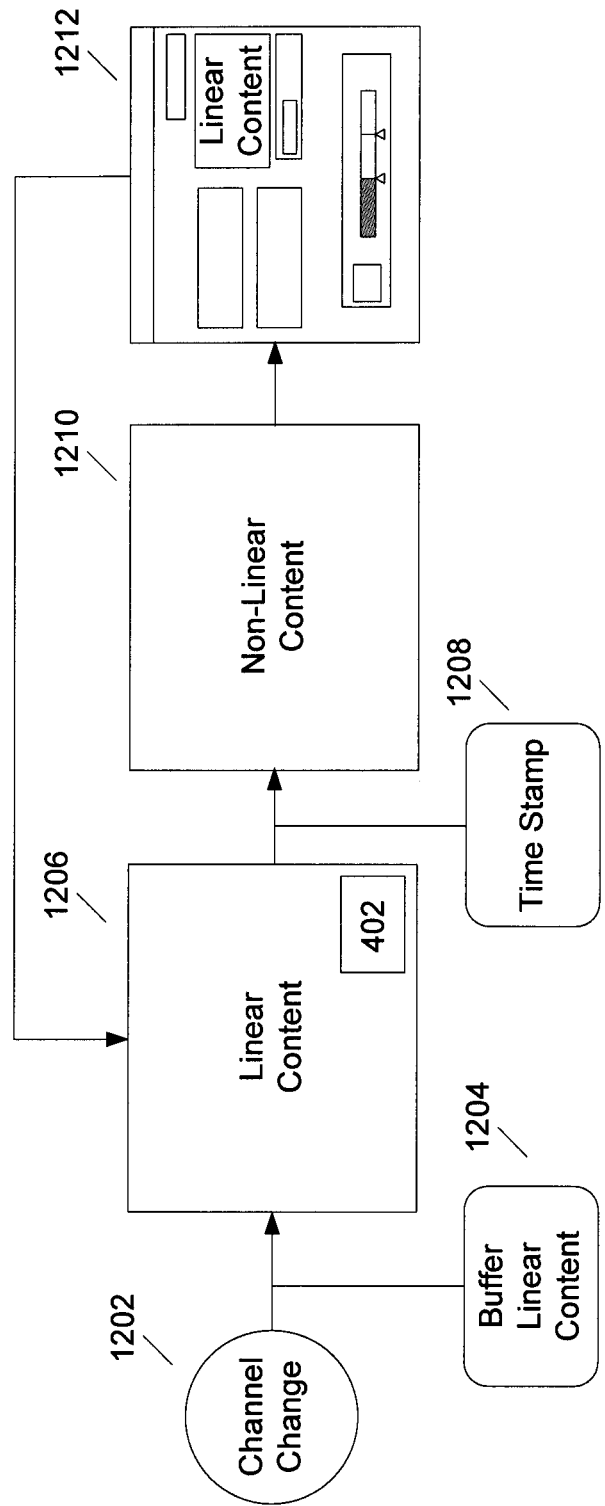
FIG. 12 illustrates various displays presented to a viewer at a display device corresponding to an example in accordance with exemplary embodiments of the present disclosure.

The following describes an example in accordance with exemplary embodiments of the present disclosure. FIG. 12 illustrates various displays presented to the viewer at the display device 104 corresponding to the example in accordance with exemplary embodiments of the present disclosure. In this example, the client device 106 may include linear content recording capabilities. The viewer, using the input device 134, may instruct the client device 106 to change a channel to cause the display device 104 to begin displaying broadcast linear content (see FIG. 12, 1202). The client device 106 may begin buffering the linear content (see FIG. 12, 1204). The client device 106 may output a linear content signal to cause the display device 104 to display the selected linear content (see FIG. 12, 1206). In this example, the linear content includes a non-linear content indicator 402. In other words, the client device 106 is not overlaying the non-linear content indicator 402 over the linear content signal because the non-linear content indicator 402 is included in the linear content signal. Thus, in this example, because the non-linear content indicator 402 is included in the broadcast linear content signal, the client device 106 may not process any guide data to determine whether any non-linear content indicator is available. For example, the non-linear content indicator 402 may be a graphic associated with a car company. The graphic may prompt the viewer to visit the car company's virtual showroom. The graphic also may include a code (e.g., 902) that the viewer may use the input device 134 to select to access the non-linear content. The code may be the non-linear content identifier for the associated non-linear content.

In this example, the viewer presses keys on the input device 134 corresponding to the code presented in the graphic of the non-linear content indicator 402. Once the code is received, the client device 106 may create a time stamp of the time when the code is received (see FIG. 12, 1208). The client device 106 may forward a non-linear content request to the non-linear content server 130 that includes the code. The non-linear content server 130 may identify non-linear content associated with the code, and may forward the non-linear content to the client device 106 in a non-linear content response.

The client device 106 may receive the non-linear content response and may output a non-linear content signal based on the non-linear content to cause the display device 104 to display the non-linear content (see FIG. 12, 1210). For example, the non-linear content may be a long form video advertisement. The client device 106 may identify a termination identifier associated with the non-linear content, and may output a content transition interface signal to cause the display device 104 to display the content transition interface 700. The content transition interface 700 may include a previous location field 702 and a current location field 704 (see FIG. 12, 1212). The content transition interface 700 may prompt the viewer to return to the linear content where they left off and/or may prompt the viewer to watch live broadcast linear content. If the viewer selects the previous location field 702, the client device 106 may retrieve the buffered linear content based on the time stamp. The video module 204 may cause display of the buffered linear content at the display device 104 beginning at the time stamp. Thus, the viewer may return to the linear content where the viewer left off without missing any of the linear content broadcast. If the viewer selects the current location field 704, the client device 106 to display the live broadcast linear content as received from the a video head office (VHO) 120.

It is noted that the above description has been provided describing the client device 106 being used at a fixed subscriber location 106. The client device 106 also may be used in other systems. In an exemplary embodiment, the client device 106, the display device 104, and the input device 134 may be implemented at a single computing device, which may be, for example, a mobile phone, a mobile computing device, a personal digital assistant, etc. In such an embodiment, the single computing device, instead of communicating with the central office 110, may communicate with wireless network to receive, as well as transition back and forth from, the linear content and the non-linear content.

Thus, a system in accordance with the exemplary embodiments described above permit a viewer to view linear content and to interrupt the linear content to view associated non-linear content. The exemplary system may permit viewers to view content and non-linear content when desired. The exemplary system permits the viewers to retrieve the non-linear content now, after, or at a later time thereby ensuring that the viewer is able to watch broadcast content without missing any of the content. The exemplary system encourages viewers to navigate into non-linear space without worrying about missing what is playing on broadcast content. The exemplary system also advantageously meets the needs the needs of advertisers who wish to advertise linearly and non-linearly. The exemplary system may used as a selling point to networks and advertisers when negotiating contracts for television service as the provider of the exemplary system encourages viewers to use non-linear advertising without fully disrupting the conventional, linear advertising model.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method comprising:
sending, by a device, a linear content signal to cause display of linear content at a display device;
determining, by the device and based on guide data, that at least one non-linear content is associated with the linear content displayed at the display device,
the guide data including a linear content identifier identifying the linear content and at least one non-linear content identifier identifying the at least one non-linear content;
determining, by the device, whether the device includes recording capabilities to record the linear content;
causing, by the device, the display device to display a first graphical user interface when the device does not include the recording capabilities,
the linear content being displayed via the first graphical user interface,
the first graphical user interface including information identifying the at least one non-linear content, a first field that causes the at least one non-linear content to be retrieved after a period of time, and a second field that causes a reminder regarding the at least one non-linear content to be created;
causing, by the device, the display device to exit display of the linear content at a particular point and to display a second graphical user interface when the device includes the recording capabilities,
the at least one non-linear content being displayed via the second graphical user interface,
the second graphical user interface including a third field that causes the display device to display information regarding at least one of a product or a service relating to the at least one non-linear content;
detecting, by the device, an end of display of the at least one non-linear content;
causing, by the device and based on detecting the end of the display of the at least one non-linear content, the display device to display of a third graphical user interface that includes:
a fourth field that causes live broadcast linear content to be displayed, and
a fifth field that causes the linear content to be displayed from the particular point; and
causing, by the device, the display device to selectively display:
the live broadcast linear content when the fourth field is selected, or
the linear content from the particular point when the fifth field is selected.

2. The method of claim 1, further comprising:
detecting selection of the fourth field; and
sending a linear content signal to cause display of the live broadcast linear content.

3. The method of claim 1, further comprising
storing the linear content;
detecting selection of the fifth field;
retrieving a time stamp associated with the stored linear content,
the time stamp relating to a time associated with exiting display of the linear content; and
sending a stored linear content signal to cause display of the stored linear content associated with the time stamp.

4. The method of claim 1, further comprising storing the linear content before causing the display device to display the at least one non-linear content.

5. The method of claim 4, further comprising creating a time stamp associated with storing of the linear content.

6. The method of claim 1, wherein detecting the end of display of the at least one non-linear content includes detecting the end of display of the at least one non-linear content based on a termination identifier, and
wherein the termination identifier is associated with a termination request.

7. A non-transitory computer readable media comprising instructions that cause a device to perform the steps of the method of claim 1.

8. A method comprising:
sending, by a device, a linear content signal to cause display of linear content at a display device;
determining, by the device, that at least one non-linear content is associated with the linear content based on guide data,
the guide data including at least one linear content identifier identifying the linear content and at least one non-linear content identifier identifying the at least one non-linear content;
causing, by the device, the display device to display a non-linear content indicator with the linear content,
the non-linear content indicator being associated with the at least one non-linear content identifier;
detecting, by the device, selection of the non-linear content indicator;
determining, by the device, whether the device includes recording capabilities to record the linear content, after detecting the selection of the non-linear content indicator;
causing, by the device, the display device to display a first graphical user interface when the device does not include the recording capabilities,
the linear content being displayed via the first graphical user interface,
the first graphical user interface including information identifying the at least one non-linear content, a first field that causes the at least one non-linear content to be retrieved after a particular period of time, and a second field that causes a reminder regarding the at least one non-linear content to be created; and
causing, by the device, the display device to exit display of the linear content and to display a second graphical user interface when the device includes the recording capabilities,
the at least one non-linear content being displayed via the second graphical user interface,
the second graphical user interface including a third field that causes the display device to display information regarding at least one of a product or a service relating to the at least one non-linear content.

9. The method of claim 8, further comprising:
creating a time stamp associated with exiting display of the linear content;
detecting an end of display of the at least one non-linear content; and causing the display device to resume display of the linear content based on the time stamp.

10. The method of claim 8, further comprising storing the linear content after detecting selection of the non-linear content indicator when the device includes the recording capabilities.

11. The method of claim 8, where the first graphical user interface further includes a field that causes the device to forward the non-linear content to another device.

12. The method of claim 11, where the first graphical user interface further includes a field that causes the device to print a screen shot of the at least one nonlinear content.

13. The method of claim 11, where the first graphical user interface further includes a field that causes a non-linear content identifier, associated with the non-linear content, to be stored.

14. A non-transitory computer readable media comprising instructions that cause a device to perform the steps of the method of claim 8.

15. A method comprising:
sending, by a device, a linear content signal to cause display of linear content at a display device;
determining, by the device, that at least one non-linear content is associated with the linear content;
determining, by the device, whether the device includes recording capabilities to record the linear content;
causing, by the device, the display device to display a first graphical user interface when the device does not include the recording capabilities,
the linear content being displayed via the first graphical user interface,
the first graphical user interface including a first field that causes the at least one non-linear content to be retrieved after a particular period of time and a second field that causes an identifier associated with the at least one non-linear content to be stored;
causing, by the device, the display device to exit display of the linear content and to display a second graphical user interface when the device includes the recording capabilities,
the at least one non-linear content being displayed via the second graphical user interface,
the second graphical user interface including a third field that causes the display device to display information regarding at least one of a product or a service relating to the at least one non-linear content; and
selectively causing by the device:
the at least one non-linear content to be retrieved, after the particular period of time, and displayed when selection of the first field is detected, or
the identifier, associated with the at least one non-linear content, to be stored.

16. The method of claim 15, further comprising:
detecting an end of display of the at least one non-linear content; and
sending a linear content signal to cause the display device to resume display of the linear content after detecting the end of display of the at least one non-linear content.

17. The method of claim 15, further comprising:
retrieving the at least one non-linear content based on the identifier associated with the at least one non-linear content.

18. A non-transitory computer readable media comprising instructions that cause a device to perform the steps of the method of claim 15.

19. A system comprising:
a video module, implemented at least partially in hardware, to:
cause display of linear content and non-linear content at a display device, and
identify a termination identifier associated with an end of display of the non-linear content;
a graphical user interface module, implemented at least partially in hardware and communicatively coupled to the video module, to:
determine that the non-linear content is associated with the linear content,
instruct the video module to cause display of a first graphical user interface when a device, associated with the graphical user interface module, does not include capabilities to record the linear content,
the linear content being displayed via the first graphical user interface,
the first graphical user interface including information identifying the at least one non-linear content, a first field that causes the at least one non-linear content to be retrieved after a first period of time and displayed, and a second field that causes a reminder regarding the at least one non-linear content to be created and displayed after a second period of time,
instruct the video module to cause display of a second graphical user interface when the device includes the capabilities to record the linear content,
the at least one non-linear content being displayed via the second graphical user interface,
the second graphical user interface including a third field that causes display of information regarding at least one of a product or a service relating to the at least one non-linear content,
instruct the video module to cause display of a third graphical user interface when the end of display of the at least one non-linear content is detected based on the termination identifier,
the third graphical user interface including a fourth field that causes display of live broadcast linear content and a fifth field that causes display of buffered linear content corresponding to the linear content, and
selectively cause display of the live broadcast linear content when the fourth field is selected or display of the buffered linear content when the fifth field is selected.

20. A system comprising:
a client device to:
cause display of linear content at a display device,
determine that non-linear content is associated with the linear content,
cause display of a first graphical user interface when the client device does not include capabilities to record the linear content,
the linear content being displayed via the first graphical user interface,
the first graphical user interface including information identifying the at least one non-linear content, a first field that causes the at least one non-linear content to be retrieved after a first period of time and displayed, and a second field that causes a reminder regarding the at least one non-linear content to be created and displayed after a second period of time, cause display of a second graphical user interface when the client device includes the capabilities to record the linear content,
  the at least one non-linear content being displayed via the second graphical user interface,
  the second graphical user interface including a third field that causes display of information regarding at least one of a product or a service relating to the at least one non-linear content,
cause display of a third graphical user interface when an end of display of the at least one non-linear content is detected,
  the third graphical user interface including a fourth field that causes display of live broadcast linear content and a fifth field that causes display of buffered linear content corresponding to the linear content, and
selectively cause display of the live broadcast linear content when the fourth field is selected or display of the buffered linear content when the fifth field is selected.

* * * * *